United States Patent
Noguchi

(10) Patent No.: US 12,379,883 B2
(45) Date of Patent: Aug. 5, 2025

(54) IMAGE FORMING APPARATUS, METHOD FOR CONTROLLING IMAGE FORMING APPARATUS, AND STORAGE MEDIUM FOR CONTROLLING START OF PRINTING

(71) Applicant: CANON KABUSHIKI KAISHA, Tokyo (JP)

(72) Inventor: Takayoshi Noguchi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 18/326,429

(22) Filed: May 31, 2023

(65) Prior Publication Data

US 2023/0393793 A1 Dec. 7, 2023

(30) Foreign Application Priority Data

Jun. 7, 2022 (JP) .................................. 2022-092226

(51) Int. Cl.
G06F 3/12 (2006.01)
H04N 1/00 (2006.01)

(52) U.S. Cl.
CPC .......... *G06F 3/1267* (2013.01); *G06F 3/1205* (2013.01); *G06F 3/1208* (2013.01); *H04N 1/00588* (2013.01)

(58) Field of Classification Search
None
See application file for complete search history.

(56) References Cited

U.S. PATENT DOCUMENTS

| | | | |
|---|---|---|---|
| 7,239,645 B2 * | 7/2007 | Suri | H04L 49/9047 |
| | | | 710/52 |
| 2008/0144093 A1 * | 6/2008 | Zaima | G06K 17/0016 |
| | | | 358/1.15 |
| 2017/0070628 A1 * | 3/2017 | Unno | H04N 1/00822 |

FOREIGN PATENT DOCUMENTS

JP 2010284821 A * 12/2010

* cited by examiner

*Primary Examiner* — Akwasi M Sarpong
*Assistant Examiner* — Pawan Dhingra
(74) *Attorney, Agent, or Firm* — Canon U.S.A., Inc. IP Division

(57) ABSTRACT

An image forming apparatus includes a reception unit and a controller. The reception unit is configured to receive a plurality of image data in a sequential manner. The controller is configured to perform control, in a case where first image data among the plurality of image data is received, so as not to start printing upon reception of the first image data in a case where the first image data has a different print setting from second image data received before the first image data, and perform control, in a case where third image data received after the first image data has a same print setting as the second image data, so as to arrange, in a main scan direction of a sheet, image data having the same print setting and including not the first image data but the second image data and the third image data to start printing.

9 Claims, 7 Drawing Sheets

| MARGIN WIDTH | GREATER THAN OR EQUAL TO 2/3 OF SHEET | GREATER THAN OR EQUAL TO 1/3 OF SHEET AND LESS THAN 2/3 OF SHEET | GREATER THAN OR EQUAL TO 1/5 OF SHEET AND LESS THAN 1/3 OF SHEET | LESS THAN 1/5 OF SHEET |
|---|---|---|---|---|
| WAITING TIME | 10 MINUTES | 6 MINUTES | 3 MINUTES | 0 MINUTES |

# IMAGE FORMING APPARATUS, METHOD FOR CONTROLLING IMAGE FORMING APPARATUS, AND STORAGE MEDIUM FOR CONTROLLING START OF PRINTING

BACKGROUND

Field of the Disclosure

The present disclosure relates to an image forming apparatus, a method for controlling an image forming apparatus, and a storage medium.

Description of the Related Art

An image forming apparatus such as a printer or a copier is known that temporarily stores, in a non-volatile memory such as a built-in hard disk, image data received from a host apparatus, reads out, as needed, image data stored in the non-volatile memory, and prints an image represented by the image data. Among image forming apparatuses of this type, an image forming apparatus such as a large format printer or the like that prints an image represented by image data on a large sheet in order to print a poster or the like has been recently widely used. In a large format printer, rolled paper is used as a sheet, and printing is performed. Usually, images represented by image data are printed such that the images are arranged side by side in a sheet conveyance direction (a longitudinal direction).

In the above-described image forming apparatus, when rolled paper that is significantly wide for the widths of the images represented by the image data is set, nothing is printed from the right ends of the printed images to the right end of the sheet, thereby resulting in sheet wastage. A function called nesting printing is thus known in which sheet wastage is reduced by storing a plurality of image data in a non-volatile memory such as a hard disk, and arranging images represented by the image data in a main scan direction (a lateral direction) of the sheet. In nesting printing, printing is on standby to receive subsequent image data until the width of the sheet in the main scan direction is filled with images represented by received image data.

However, in a case where a predetermined waiting time has elapsed or image data having a different print setting is received, printing is started even when the width of a margin of the sheet in the main scan direction is large. Thus, there is a problem in that nesting printing is insufficient as a function for reducing sheet wastage.

In order to solve such a problem, an image forming apparatus is known that can reduce sheet wastage by applying the same print setting to image data having a different print setting to enable nesting printing (see Japanese Patent Laid-Open No. 2010-284821).

In Japanese Patent Laid-Open No. 2010-284821, nesting printing is enabled by changing the print setting of received image data to a predetermined standardized print setting. However this has the result that an image represented by image data may not be printed using the print setting that is originally set for the image data. Moreover, in a case where a predetermined waiting time has elapsed, printing is started, so that there may be a case where sheet wastage cannot be reduced.

SUMMARY

The present disclosure generally enables sheet wastage to be reduced.

Aspects of the present disclosure provide an image forming apparatus including a reception unit and a controller. The reception unit is configured to receive a plurality of image data in a sequential manner. The controller is configured to perform control, in a case where first image data among the plurality of image data is received, so as not to start printing upon reception of the first image data in a case where the first image data has a different print setting from second image data received before the first image data, and perform control, in a case where third image data received after the first image data has a same print setting as the second image data, so as to arrange, in a main scan direction of a sheet, image data having the same print setting and including not the first image data but the second image data and the third image data to start printing.

Further features of the present disclosure will become apparent from the following description of embodiments with reference to the attached drawings.

DESCRIPTION OF THE EMBODIMENTS

Figure 1:
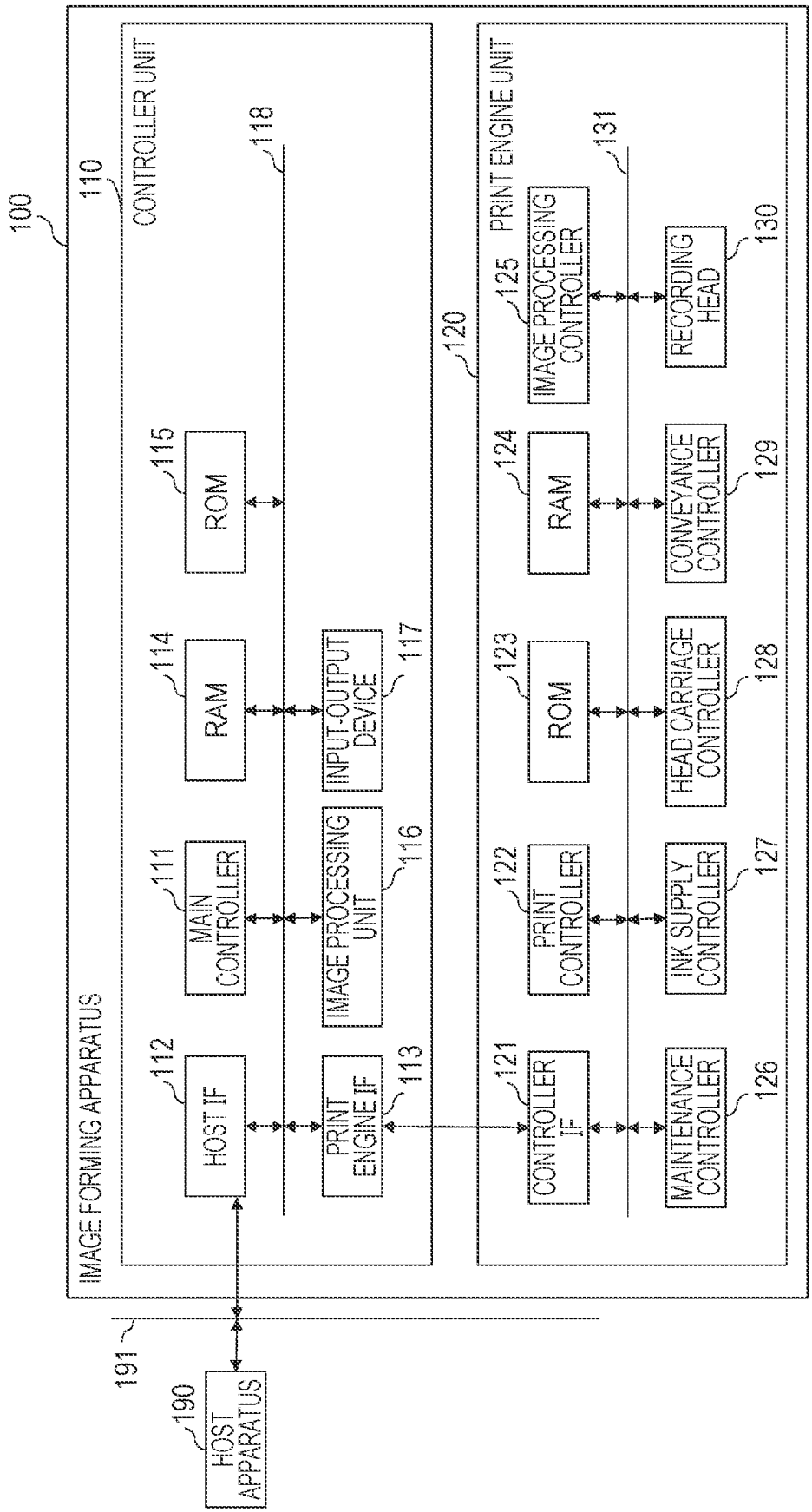
FIG. 1 is a diagram illustrating an example of the configuration of an image forming apparatus.

In the following, embodiments will be described in detail with reference to the drawings. Note that the following embodiments are not intended to limit the present disclosure according to the Claims. A plurality of characteristics are described in the embodiments; however, all of these characteristics are not always necessary, and some of the plurality of characteristics may be freely combined. Furthermore, in the drawings, the same or substantially the same configurations are denoted by the same reference numerals, and redundant description will be omitted.

First Embodiment

FIG. 1 is a diagram illustrating an example of the configuration of an image forming apparatus 100 according to a first embodiment. The image forming apparatus 100 includes a controller unit 110 and a print engine unit 120. The image forming apparatus 100 can be connected to a host apparatus 190 via a network 191.

The controller unit 110 includes a main controller 111, a host interface (host IF) 112, a print engine interface (print engine IF) 113, a random access memory (RAM) 114, a read-only memory (ROM) 115, an image processing unit 116, and an input-output device 117.

These constituent elements are connected to each other with a system bus 118 interposed therebetween.

The main controller 111 includes a central processing unit (CPU). The main controller 111 performs a print operation using the RAM 114 as a work area in accordance with a program or various parameters stored in the ROM 115, and controls the entire operation of the image forming apparatus 100. For example, the host IF 112 receives image data from the host apparatus 190. Then, the image processing unit 116 performs predetermined image processing on the received image data in accordance with a command from the main controller 111. The main controller 111 then transmits, to the print engine unit 120 through the print engine IF 113, image data on which image processing has been performed.

The RAM 114 is used as a work area of the main controller 111, is used as a temporary storage area for various types of reception data, and stores various types of setting data.

The ROM 115 stores a program to be executed by the main controller 111, or various types of data necessary for the image forming apparatus 100 to perform various operations.

The image processing unit 116 performs various types of image processing. For example, the image processing unit 116 performs processing for developing (converting) image data expressed in a page description language into bitmap image data.

Moreover, the image processing unit 116 performs processing for converting the color space (for example, YCbCr) of input image data into a standard RGB color space (for example, sRGB). Moreover, the image processing unit 116 performs, as needed, various types of image processing such as resolution conversion into an effective number of pixels (for which print processing can be performed by the image forming apparatus 100), image analysis, image correction, or the like. Moreover, the image processing unit 116 combines a plurality of image data to generate one image data. The main controller 111 stores, in the RAM 114, image data obtained through these kinds of image processing.

The input-output device 117 includes a hard key or a panel for the user to perform various operations, and includes a display unit for displaying (reporting) various types of information to the user. Moreover, the input-output device 117 may report information to the user by outputting sound (a beep, an audio message, or the like) based on acoustic information from a voice and sound generator.

The print engine unit 120 is a print unit that performs image forming. The print engine unit 120 includes a controller interface (controller IF) 121, a print controller 122, a ROM 123, a RAM 124, and an image processing controller 125. Furthermore, the print engine unit 120 includes a maintenance controller 126, an ink supply controller 127, a head carriage controller 128, a conveyance controller 129, and a recording head 130. These constituent elements are connected to each other with a system bus 131 interposed therebetween.

The print controller 122 includes a CPU, and controls, using the RAM 124 as a work area, various mechanisms of the print engine unit 120 in accordance with a program or various parameters stored in the ROM 123. Upon receiving various commands or image data from the controller unit 110 via the controller IF 121, the print controller 122 temporarily stores the received commands or image data in the RAM 124.

The image processing controller 125 converts the image data stored by the print controller 122 into recording data in accordance with a command from the print controller 122, so that the recording data can be used in a recording operation of the recording head 130. When the recording data is generated, the print controller 122 causes the recording head 130 to execute a recording operation based on the recording data. In this case, the conveyance controller 129 conveys a sheet in accordance with a command from the print controller 122. The recording head 130 performs, in accordance with a command from the print controller 122, a recording operation in conjunction with a sheet conveyance operation, and performs processing for printing the recording data on the sheet.

The maintenance controller 126 controls cleaning of a conveyance roller, which is controlled by the conveyance controller 129, or cleaning of the recording head 130.

The ink supply controller 127 controls the pressure of ink supplied to the recording head 130 such that the pressure of ink falls within an appropriate range.

The head carriage controller 128 changes the direction or position of the recording head 130 in accordance with an operation state such as the maintenance state or recording state of the image forming apparatus 100.

The recording head 130 is a print unit for printing images, and prints images based on image data on a sheet (paper). The recording head 130 holds, for example, a plurality of print heads corresponding to a plurality of colors, and forms an image on a sheet by discharging ink in conjunction with conveyance of the sheet.

Note that the image forming apparatus 100 will be described as an inkjet printer, in which ink is used as a recording material; however, the image forming apparatus 100 is not limited to an inkjet printer. The image forming apparatus 100 can be used in printing apparatuses of various print types, such as a thermal printer (a dye-sublimation printer, a thermal transfer printer, or the like), a dot impact printer, or an electrophotographic printer such as a light-emitting diode (LED) printer or a laser printer.

Note that, in the present embodiment, the input-output device 117 is inside the image forming apparatus 100; however, the location of the input-output device 117 is not limited to this, and may be, for example, provided as an external configuration connected to the image forming apparatus 100 via the network 191. Alternatively, the host apparatus 190 may also serve as the input-output device 117. Moreover, in addition to the input-output device 117, the image forming apparatus 100 may further be connectable to another input-output device via the network 191 or the like.

In the present embodiment, the image forming apparatus 100 stores image data in the RAM 114 and the RAM 124; however, the image forming apparatus 100 may store image data in a non-volatile device such as a hard disk drive (HDD).

The host apparatus 190 is, for example, an external device serving as an image data supply source, and a printer driver is installed in the host apparatus 190. The image forming apparatus 100 may be connectable to a data providing device, which serves as for example an image data supply source, instead of the host apparatus 190. Examples of the image data supply source include a digital camera and a smartphone. Each device and the image forming apparatus 100 are not necessarily connected with each other via the network 191. For example, each device and the image forming apparatus 100 may be directly connected to each other through wireless communication.

Note that a program for realizing the functions of the present embodiment may be supplied to a system or an apparatus via a network or various recording media. Moreover, a computer (a CPU, a microprocessing unit (MPU), or the like) of the system or apparatus may read out the program to execute the functions, or may cause various mechanisms to execute the functions. Moreover, this program may be executed by one computer or a plurality of computers operating in conjunction with each other. In addition, the entire processing described above does not need to be realized by using software, and part or the entirety of the processing may be realized using hardware such as an application-specific integrated circuit (ASIC). Furthermore, an embodiment in which the entire processing is performed by one CPU is not the only embodiment to perform the processing. An embodiment in which a plurality of CPUs perform processing in cooperation with each other as appropriate may be performed, or an embodiment in which part of the processing is performed by one CPU, and the rest of the processing is performed by a plurality of CPUs may be performed.

Figure 2:
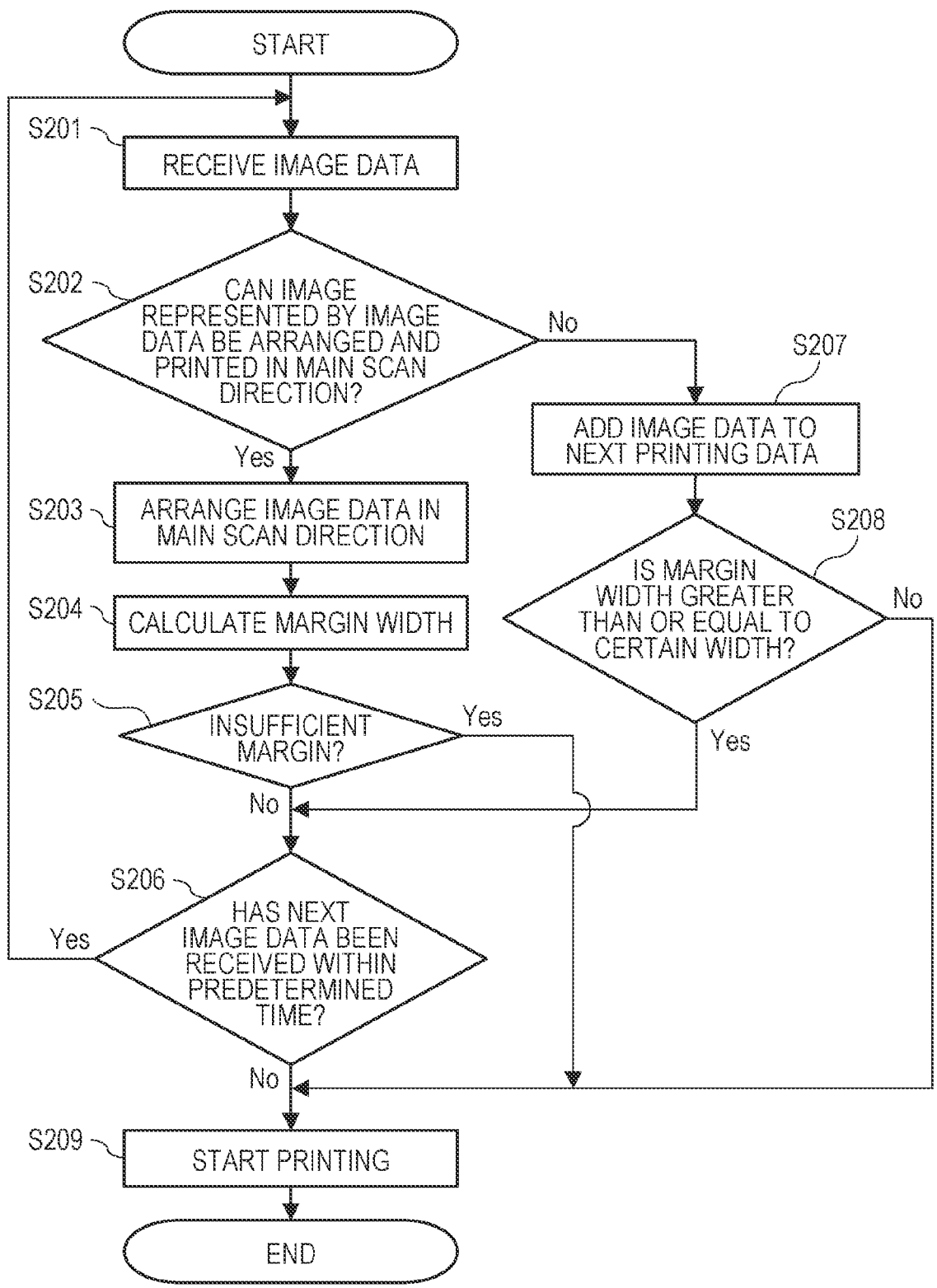
FIG. 2 is a flow chart illustrating an example of processing from reception of image data to start of printing.

FIG. 2 is a flow chart illustrating an example of a method for controlling the image forming apparatus 100, and illustrates an example of processing from reception of image data to start of printing, the processing being performed by the image forming apparatus 100. The following describes an example of the procedure of processing performed by the image forming apparatus 100.

Figure 3:
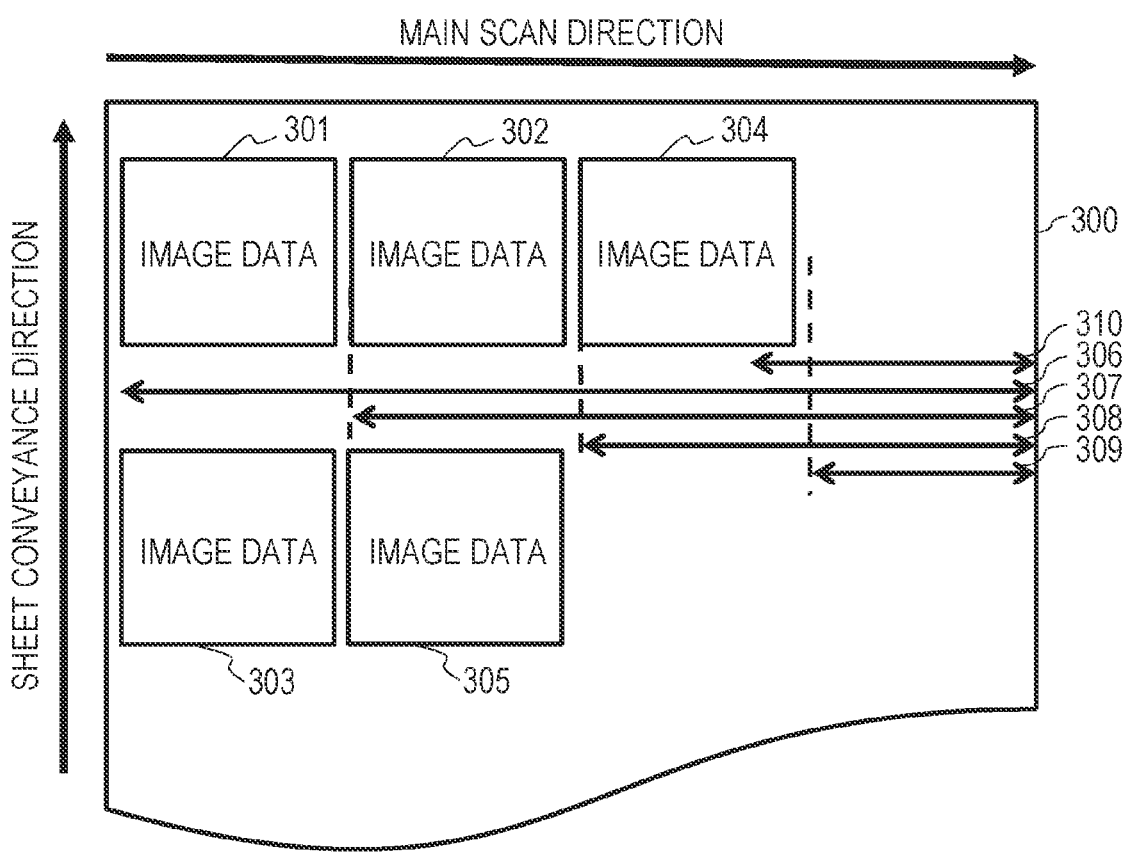
FIG. 3 is a diagram illustrating an example of image data to be subjected to printing in the image forming apparatus.

FIG. 3 is a diagram illustrating an example of positions on a sheet 300 where images represented by image data 301 to 305 are to be printed by the image forming apparatus 100. The image forming apparatus 100 receives the image data 301, the image data 302, the image data 303, the image data 304, and the image data 305 in this order, and prints the images represented by the image data 301 to 305 on the sheet 300. The images represented by the image data 301, the image data 302, and the image data 304 have the same print setting as each other. The images represented by the image data 303 and the image data 305 have a different print setting from the images represented by the image data 301, the image data 302, and the image data 304.

First, the image forming apparatus 100 receives the image data 301 and 302, which have the same print setting as each other. Thereafter, the image forming apparatus 100 receives the image data 303, which has a different print setting from the image data 301 and 302. Thereafter, the image forming apparatus 100 receives the image data 304, which has the same print setting as the image data 301 and 302. Thereafter, the image forming apparatus 100 receives the image data 305, which has a different print setting from the image data 301 and 302.

As an example of the print settings, suppose that the print quality of the image data 301, the image data 302, and the image data 304 is "Fine", and the print quality of the image data 303 and the image data 305 is "Standard" in the following. A width 306 is a width across which an image or images represented by image data can be printed in a main scan direction of the sheet 300. A width 307 (hereinafter also referred to as a "margin width 307") is a margin width for a case where the image represented by the image data 301 is printed. A width 308 (hereinafter also referred to as a "margin width 308") is a margin width for a case where the images represented by the image data 301 and 302 are arranged and printed side by side in the main scan direction. A width 309 (hereinafter also referred to as a "margin width 309") is a margin width for a case where the images represented by the image data 301, 302, and 304 are arranged and printed side by side in the main scan direction. A width 310 is the width of a print start determination margin used to determine whether to start printing when the image data 303 and 305 corresponding to the different print setting are received.

The sheet 300 is, for example, rolled paper. The image forming apparatus 100 is, for example, a large format printer or the like that can print an image represented by image data on a large sheet 300 in order to print a poster or the like. The image forming apparatus 100 prints images represented by the image data 301 to 305 on the sheet 300, which is for example rolled paper. The width of the sheet 300 is significantly larger than the width of each of the images represented by the image data 301 to 305. The image forming apparatus 100 reduces the margin width 309 by printing the images represented by the image data 301, 302, and 304 having the same print setting as each other side by side in a single row, and can thus reduce wastage of the sheet 300. Similarly, the image forming apparatus 100 can reduce the width of a margin by printing the images represented by the image data 303 and 305 having the same print setting as each other side by side in a single row, and can thus reduce wastage of the sheet 300. The images represented by the image data 303 and 305 are at a different position from the images represented by the image data 301, 302, and 304 in a sheet conveyance direction, the image data 301, 302, and 304 having a different print setting from the image data 303 and 305. The image forming apparatus 100 does not print the images represented by the image data 301 and 302 upon reception of the image data 303, and arranges and prints the images represented by the image data 301, 302, and 304 side by side in the main scan direction upon reception of the image data 305. In the following, the present embodiment will be described with reference to FIGS. 1 to 3.

In Step S201, the host IF 112 receives the image data 301 from the host apparatus 190, stores the received image data 301 in the RAM 114, and sends a notification to the main controller 111.

In Step S202, the main controller 111 determines whether the image represented by the image data 301 stored in the RAM 114 can be printed in the main scan direction of the sheet 300. In a case where the image represented by the image data 301 stored in the RAM 114 can be printed in the main scan direction of the sheet 300, the process proceeds to Step S203. Otherwise, the process proceeds to Step S207. In this case, the width 306 of a margin of the sheet 300 is greater than or equal to a width necessary for printing the image represented by the image data 301. Thus, the main controller 111 determines that the image represented by the image data 301 can be printed in the main scan direction of the sheet 300, and the process proceeds to Step S203.

In Step S203, the main controller 111 retains, in the RAM 114, the image data 301 as image data representing an image to be printed in the main scan direction of the sheet 300.

In Step S204, the main controller 111 calculates the margin width 307 of the sheet 300 for a case where the image represented by the image data 301 is printed. The main controller 111 stores the margin width 307 in the RAM 114, the margin width 307 being obtained by subtracting the width necessary for printing the image represented by the image data 301 from the width 306, across which an image or images represented by image data can be printed in the main scan direction of the sheet 300.

In Step S205, the main controller 111 determines whether the width 307 of the margin is less than a width threshold for further printing another image in the main scan direction of the sheet 300. In a case where the margin width 307 is less than the threshold, the process proceeds to Step S209. In a case where the margin width 307 is not less than the threshold, the process proceeds to Step S206. In this case, the main controller 111 determines that the margin width 307 is not less than the threshold, and the process proceeds to Step S206.

In Step S206, the main controller 111 determines whether reception of the next image data is detected within a predetermined time from reception of the image data 301 in Step S201.

Information that specifies the predetermined time is stored in the ROM 115. In a case where reception of the next image data is detected within the predetermined time, the process proceeds to Step S201. In a case where reception of the next image data is not detected within the predetermined time, the process proceeds to Step S209. In this case, the main controller 111 determines that reception of the next image data, which is the image data 302, is detected within the predetermined time, and the process proceeds to Step S201.

In Step S201, the host IF 112 receives the image data 302 from the host apparatus 190, stores the received image data 302 in the RAM 114, and sends a notification to the main controller 111.

In Step S202, the main controller 111 determines whether the images represented by the image data 301 and 302 stored in the RAM 114 can be arranged and printed side by side in the main scan direction of the sheet 300. In a case where the images represented by the image data 301 and 302 stored in the RAM 114 can be printed side by side in the main scan direction of the sheet 300, the process proceeds to Step S203. Otherwise, the process proceeds to Step S207. The width 306, across which printing can be performed on the sheet 300, is greater than or equal to a width necessary for arranging and printing the images represented by the image data 301 and 302 side by side in the main scan direction of the sheet 300. That is, the margin width 307 is greater than or equal to a width necessary for arranging and printing the image represented by the image data 302 in the main scan direction of the sheet 300. The image data 301 and 302 have the same print setting as each other (a print quality of "Fine"). Thus, the main controller 111 determines that the images represented by the image data 301 and 302 can be arranged and printed side by side in the main scan direction of the sheet 300, and the process proceeds to Step S203.

In Step S203, the main controller 111 stores, in the RAM 114, the image data 301 and 302 as image data representing images to be arranged and printed side by side in the main scan direction.

In Step S204, the main controller 111 calculates the margin width 308 of the sheet 300 for a case where the images represented by the image data 301 and 302 are printed. The main controller 111 stores the margin width 308 in the RAM 114, the margin width 308 being obtained by subtracting the width necessary for printing the images represented by the image data 301 and 302 from the width 306, across which an image or images represented by image data can be printed in the main scan direction of the sheet 300. Note that the margin width 308 may also be calculated as a width obtained by subtracting a width necessary for printing the image represented by the image data 302 from the margin width 307.

In Step S205, the main controller 111 determines whether the margin width 308 is less than the width threshold for further printing another image in the main scan direction of the sheet 300. In a case where the margin width 308 is less than the threshold, the process proceeds to Step S209. In a case where the margin width 308 is not less than the threshold, the process proceeds to Step S206. In this case, the main controller 111 determines that the margin width 308 is not less than the threshold, and the process proceeds to Step S206.

In Step S206, the main controller 111 determines whether reception of the next image data is detected within a predetermined time from reception of the image data 302 in Step S201.

In a case where reception of the next image data is detected within the predetermined time, the process proceeds to Step S201. In a case where reception of the next image data is not detected within the predetermined time, the process proceeds to Step S209. In this case, the main controller 111 determines that reception of the next image data, which is the image data 303, is detected within the predetermined time, and the process proceeds to Step S201.

In Step S201, the host IF 112 receives the image data 303 from the host apparatus 190, stores the received image data 303 in the RAM 114, and sends a notification to the main controller 111.

In Step S202, the main controller 111 determines whether the images represented by the image data 301, 302, and 303 stored in the RAM 114 can be arranged and printed side by side in the main scan direction of the sheet 300. In a case where the images represented by the image data 301, 302, and 303 stored in the RAM 114 can be arranged and printed side by side in the main scan direction of the sheet 300, the process proceeds to Step S203. Otherwise, the process proceeds to Step S207. The width 306, across which printing can be performed on the sheet 300, is greater than or equal to a width necessary for arranging and printing the images represented by the image data 301, 302, and 303 side by side in the main scan direction of the sheet 300. That is, the margin width 308 is greater than or equal to a width necessary for arranging and printing the image represented by the image data 303 in the main scan direction of the sheet 300. However, the image data 303 has a different print setting (a print quality of "Standard") from those (a print quality of "Fine") of the image data 301 and 302. Thus, the main controller 111 determines that the images represented by the image data 301, 302, and 303 cannot be arranged and printed side by side in the main scan direction of the sheet 300, and the process proceeds to Step S207.

In Step S207, the main controller 111 stores, in the RAM 114, the image data 303 as image data representing an image to be printed at a position shifted in the sheet conveyance direction of the sheet 300 such that the image and the images represented by the image data 301 and 302 are not arranged and printed side by side in the main scan direction of the sheet 300.

In Step S208, since the main controller 111 has received the image data 303, which has a different print setting from the image data 301 and 302, the main controller 111 determines whether to start printing the images represented by the image data 301 and 302. In a case where the margin width 308 for a case where the images represented by the image data 301 and 302 are arranged and printed side by side in the main scan direction of the sheet 300 is greater than or equal to the width 310 of the print start determination margin, the process proceeds to Step S206. In a case where the margin width 308 for the case where the images represented by the image data 301 and 302 are arranged and printed side by side in the main scan direction of the sheet 300 is not greater than or equal to the width 310 of the print start determination margin, the process proceeds to Step S209. Since the margin width 308 is greater than or equal to the width 310 of the print start determination margin, the main controller 111 does not start printing, and the process proceeds to Step S206.

In Step S206, the main controller 111 determines whether reception of the next image data is detected within a predetermined time from reception of the image data 303 in Step S201.

The main controller 111 determines that reception of the next image data, which is the image data 304, is detected within the predetermined time, and the process proceeds to Step S201.

In Step S201, the host IF 112 receives the image data 304 from the host apparatus 190, stores the received image data 304 in the RAM 114, and sends a notification to the main controller 111.

In Step S202, the main controller 111 determines whether the images represented by the image data 301, 302, and 304 stored in the RAM 114 can be arranged and printed side by side in the main scan direction of the sheet 300. The width 306, across which printing can be performed on the sheet 300, is greater than or equal to a width necessary for arranging and printing the images represented by the image data 301, 302, and 304 side by side in the main scan direction of the sheet 300. That is, the margin width 308 is greater than or equal to a width necessary for arranging and printing the image represented by the image data 304 in the main scan direction of the sheet 300. The image data 304 has the same print setting (a print quality of "Fine") as the image data 301 and 302. Thus, the main controller 111 determines that the images represented by the image data 301, 302, and 304 can be arranged and printed side by side in the main scan direction of the sheet 300, and the process proceeds to Step S203.

In Step S203, the main controller 111 stores, in the RAM 114, the image data 301, 302, and 304 as image data representing images to be arranged and printed side by side in the main scan direction.

In Step S204, the main controller 111 calculates the margin width 309 of the sheet 300 for a case where the images represented by the image data 301, 302, and 304 are printed. The main controller 111 stores the margin width 309 in the RAM 114, the margin width 309 being obtained by subtracting the width necessary for printing the images represented by the image data 301, 302, and 304 from the width 306, across which an image or images can be printed in the main scan direction of the sheet 300. Note that the margin width 309 may also be calculated as a width obtained by subtracting a width necessary for printing the image represented by the image data 304 from the margin width 308.

In Step S205, the main controller 111 determines whether the margin width 309 is less than the width threshold for further printing another image in the main scan direction of the sheet 300. In this case, the main controller 111 determines that the margin width 309 is not less than the threshold, and the process proceeds to Step S206.

In Step S206, the main controller 111 determines whether reception of the next image data is detected within a predetermined time from reception of the image data 304 in Step S201.

The main controller 111 determines that reception of the next image data, which is the image data 305, is detected within the predetermined time, and the process proceeds to Step S201.

In Step S201, the host IF 112 receives the image data 305 from the host apparatus 190, stores the received image data 305 in the RAM 114, and sends a notification to the main controller 111.

In Step S202, the main controller 111 determines whether the images represented by the image data 301, 302, 304, and 305 stored in the RAM 114 can be arranged and printed side by side in the main scan direction of the sheet 300. The width 306, across which printing can be performed on the sheet 300, is greater than or equal to a width necessary for arranging and printing the images represented by the image data 301, 302, 304, and 305 in the main scan direction of the sheet 300. That is, the margin width 309 is greater than or equal to a width necessary for arranging and printing the image represented by the image data 305 in the main scan direction of the sheet 300. However, the image data 305 has a different print setting (a print quality of "Standard") from those (a print quality of "Fine") of the image data 301, 302, and 304. Thus, the main controller 111 determines that the images represented by the image data 301, 302, 304, and 305 cannot be arranged and printed side by side in the main scan direction of the sheet 300, and the process proceeds to Step S207.

In Step S207, the main controller 111 stores, in the RAM 114, the image data 305 as image data representing an image to be printed at a position shifted in the sheet conveyance direction of the sheet 300 such that the image and the images represented by the image data 301, 302, and 304 are not arranged and printed side by side in the main scan direction of the sheet 300.

In Step S208, since the main controller 111 has received the image data 305, which has a different print setting from the image data 301, 302, and 304, the main controller 111 determines whether to start printing the images represented by the image data 301, 302, and 304. In a case where the margin width 309 for a case where the images represented by the image data 301, 302, and 304 are arranged and printed side by side in the main scan direction of the sheet 300 is greater than or equal to the width 310 of the print start determination margin, the process proceeds to Step S206. In a case where the margin width 309 for the case where the images represented by the image data 301, 302, and 304 are arranged and printed side by side in the main scan direction of the sheet 300 is not greater than or equal to the width 310 of the print start determination margin, the process proceeds to Step S209. Since the margin width 309 is not greater than or equal to the width 310 of the print start determination margin, the process proceeds to Step S209. In Step S209, the main controller 111 performs control so as to arrange, in the main scan direction of the sheet 300, the image data 301, 302, and 304 to start printing. The image processing unit 116 performs image processing on the image data 301, 302, and 304 in accordance with a command from the main controller 111, and stores, in the RAM 114, the image data 301, 302, and 304 after being subjected to image processing. The main controller 111 requests, through the print engine IF 113 and the controller IF 121, the print controller 122 to print images represented by the image data 301, 302, and 304 after being subjected to image processing. The print controller 122 stores, in the RAM 124, the image data 301, 302, and 304 after being subjected to image processing. The image processing controller 125 converts, in accordance with a command from the print controller 122, the image data 301, 302, and 304 after being subjected to image processing into recording data such that the recording data can be used in a recording operation performed by the recording head 130. Thereafter, the conveyance controller 129 conveys the sheet 300 in the sheet conveyance direction in accordance with a command from the print controller 122. In accordance with a command from the print controller 122, the recording head 130 prints, on the sheet 300, images represented by the recording data based on the image data 301, 302, and 304 after being subjected to image processing, in conjunction with the sheet 300 being conveyed.

The images represented by the image data 301, 302, and 304 are arranged and printed side by side in the main scan direction of the sheet 300.

Note that in a case where the main controller 111 determines in Step S206 that reception of the next image data is not detected, the process proceeds to Step S209. In Step S209, even when the width of a margin of the sheet 300 in the main scan direction is large, the main controller 111 performs control so as to start printing the images represented by the image data.

Thereafter, the image forming apparatus 100 prints images represented by recording data based on the image data 303 and 305 through substantially the same processing as described above. The images represented by the image data 303 and 305 are arranged and printed side by side in the main scan direction of the sheet 300. The images represented by the image data 303 and 305 are printed at a different position from the images represented by the image data 301, 302, and 304 in the sheet conveyance direction.

As described above, in Step S201, the host IF 112 serves as a reception unit, and receives the image data 301 to 305, which are a plurality of image data, in this order. In a case where the main controller 111 has received the image data 303 among the image data 301 to 305, which are a plurality of image data, the process proceeds to Step S202. In a case where the main controller 111 determines in Step S202 that the image data 303 has a different print setting from the image data 301 and 302, which have been received before the image data 303, the process proceeds to Step S207, and the main controller 111 does not start printing upon reception of the image data 303. In a case where the main controller 111 determines in Step S202 that the image data 304, which is received after the image data 303, has the same print setting as the image data 301 and 302, the process proceeds to Step S203 from Step S202. In Step S209, the main controller 111 serves as a controller, and performs control so as to arrange, in the main scan direction of the sheet 300, image data having the same print setting and including not the image data 303 but the image data 301, 302, and 304 to start printing as in FIG. 3. The above-described print setting is, for example, print quality.

In a case where the main controller 111 determines in Step S202 that currently received image data has the same print setting as the image data 301, which is first received, the main controller 111 causes the currently received image data to be included in image data arranged in the main scan direction of the sheet 300 to start printing. Moreover, in a case where the main controller 111 determines in Step S202 that the currently received image data has a different print setting from the image data 301, which is first received, the main controller 111 does not cause the currently received image data to be included in the image data arranged in the main scan direction of the sheet 300 for printing.

For example, a case where the image data 304 is received will be described. The image data 304, which is currently received, has the same print setting as the image data 301, which is first received. The sheet 300 has a margin where images represented by image data having the same print setting and including the image data 304, which is currently received, and the image data 301, which is first received, can be arranged and printed side by side in the main scan direction of the sheet 300. In that case, the process proceeds from Step S202 to Step S203, and the main controller 111 causes the image data 304, which is currently received, to be included in image data arranged in the main scan direction of the sheet 300 to start printing.

Next, a case where other image data is received will be described. Currently received image data has the same print setting as the image data 301, which is first received. The following is a case where the sheet 300 does not have a margin where images represented by image data having the same print setting and including the currently received image data and the image data 301, which is first received, can be arranged and printed side by side in the main scan direction of the sheet 300. In that case, the process proceeds from Step S202 to Step S207, and the main controller 111 does not cause the currently received image data to be included in image data arranged in the main scan direction of the sheet 300 to start printing.

Next, a case where the image data 305 is received will be described. The image data 305, which is currently received after reception of the image data 304, has a different print setting from the image data 301, which is first received. In that case, the process proceeds from Step S202 to Step S207. The margin width 309 of the sheet 300 in the main scan direction for a case where images represented by image data having the same print setting and including the image data 301, 302, and 304 are arranged and printed side by side in the main scan direction of the sheet 300 is less than a first threshold. The first threshold is, for example, the width 310. In that case, the process proceeds from Step S208 to Step S209, and the main controller 111 performs control so as to arrange, in the main scan direction of the sheet 300, image data having the same print setting and including the image data 301, 302, and 304 to start printing.

Next, a case where other image data is received will be described. The image data that is currently received after reception of the image data 304 has the same print setting as the image data 301, which is first received. The following is a case where the sheet 300 does not have a margin where images represented by image data having the same print setting and including the currently received image data and the image data 301, which is first received, can be arranged and printed side by side in the main scan direction of the sheet 300. In that case, the process proceeds from Step S202 to Step S207. The width of a margin of the sheet 300 in the main scan direction for a case where images represented by image data having the same print setting and including the image data 301, 302, and 304 are arranged and printed side by side in the main scan direction of the sheet 300 is less than the first threshold. The first threshold is, for example, the width 310. In that case, the process proceeds from Step S208 to Step S209, and the main controller 111 performs control so as to arrange, in the main scan direction of the sheet 300, image data having the same print setting and including the image data 301, 302, and 304 to start printing.

Next, a case where other image data is received will be described. The image data that is currently received after reception of the image data 304 has the same print setting as the image data 301, which is first received. The following is a case where the sheet 300 has a margin where images represented by image data having the same print setting and including the currently received image data and the image data 301, which is first received, can be arranged and printed side by side in the main scan direction of the sheet 300. In that case, the process proceeds from Step S202 to Step S203. The width of a margin of the sheet 300 in the main scan direction for a case where images represented by image data having the same print setting and including the image data 301, 302, and 304 are arranged and printed side by side in the main scan direction of the sheet 300 is less than a second threshold. The second threshold is the threshold in Step S205. In that case, the process proceeds from Step S205 to Step S209, and the main controller 111 performs control so as to arrange, in the main scan direction of the sheet 300, the image data having the same print setting and including the image data 301, 302, and 304 to start printing.

In a case where the main controller 111 determines in Step S206 that reception of the next image data is detected within a predetermined time from a reception time of the previously received image data, the main controller 111 does not start printing, and the process proceeds to Step S201.

In a case where the main controller 111 determines in Step S206 that reception of the next image data is not detected within the predetermined time from the reception time of the previously received image data, the process proceeds to Step S209. In Step S209, the main controller 111 performs control so as to arrange, in the main scan direction of the sheet 300, image data having the same print setting to start printing.

As in FIG. 3, print positions of the image data 301, 302, and 304 in the sheet conveyance direction are the same as each other. Moreover, in the sheet conveyance direction, print positions of the image data 303 and 305 differ from those of the image data 301, 302, and 304.

As described above, after receiving the image data 301 and 302 having the same print setting, even when the image forming apparatus 100 receives the image data 303, which has a different print setting from the image data 301 and 302, the image forming apparatus 100 does not start printing in a case where the margin width 308 in the main scan direction is large. In a case where the image forming apparatus 100 further receives the image data 304, which has the same print setting as the image data 301 and 302, the image forming apparatus 100 arranges and prints the images represented by the image data 301, 302, and 304 side by side in the main scan direction of the sheet 300, so that wastage of the sheet 300 can be reduced. The image forming apparatus 100 determines a print start timing in accordance with the width of the margin of the sheet 300 in the main scan direction, and wastage of the sheet 300 can be reduced.

Second Embodiment

Figure 4:
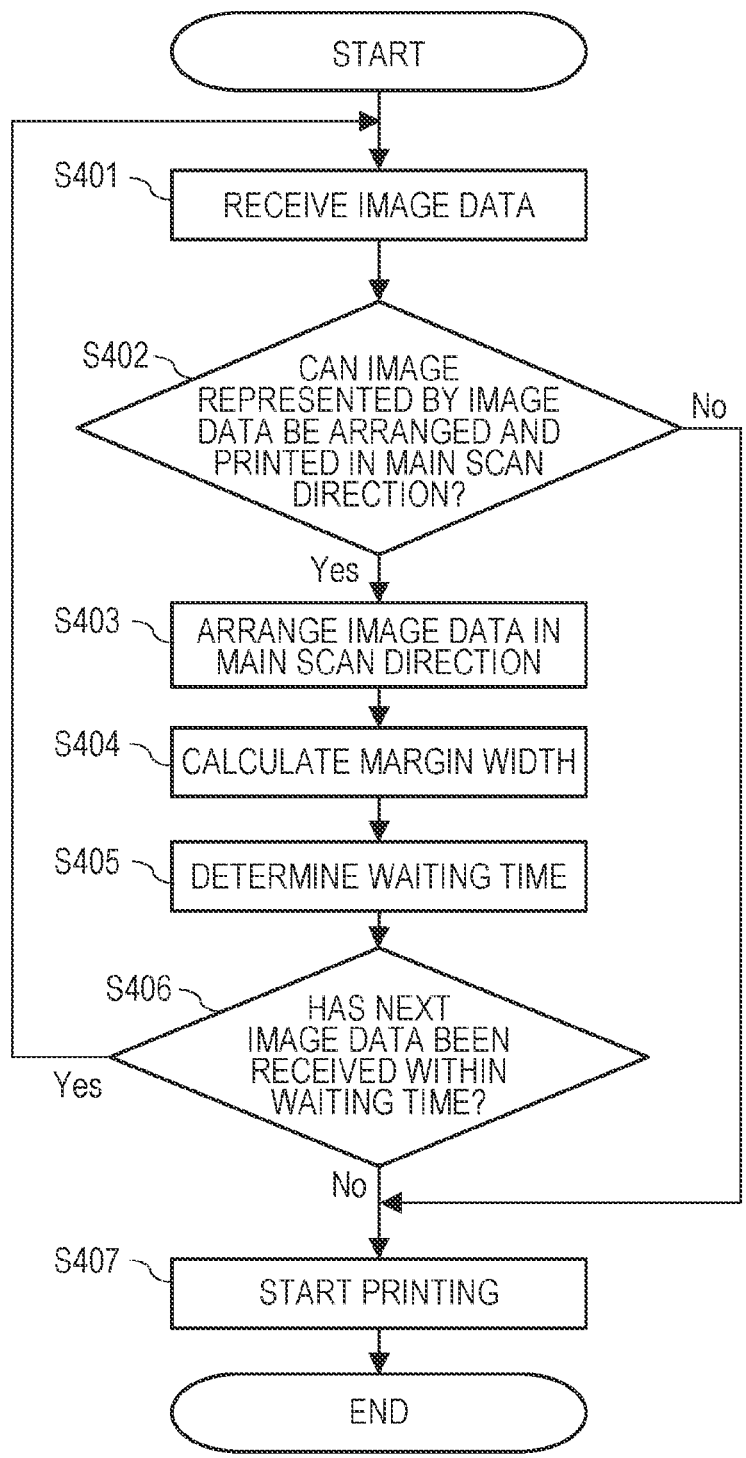
FIG. 4 is a flow chart illustrating an example of processing from reception of image data to start of printing.

FIG. 4 is a flow chart illustrating an example of method for controlling an image forming apparatus 100 according to a second embodiment, and illustrates an example of processing from reception of image data to start of printing in the image forming apparatus 100. In the following, differences between the second embodiment and the first embodiment will be described.

Figure 5:
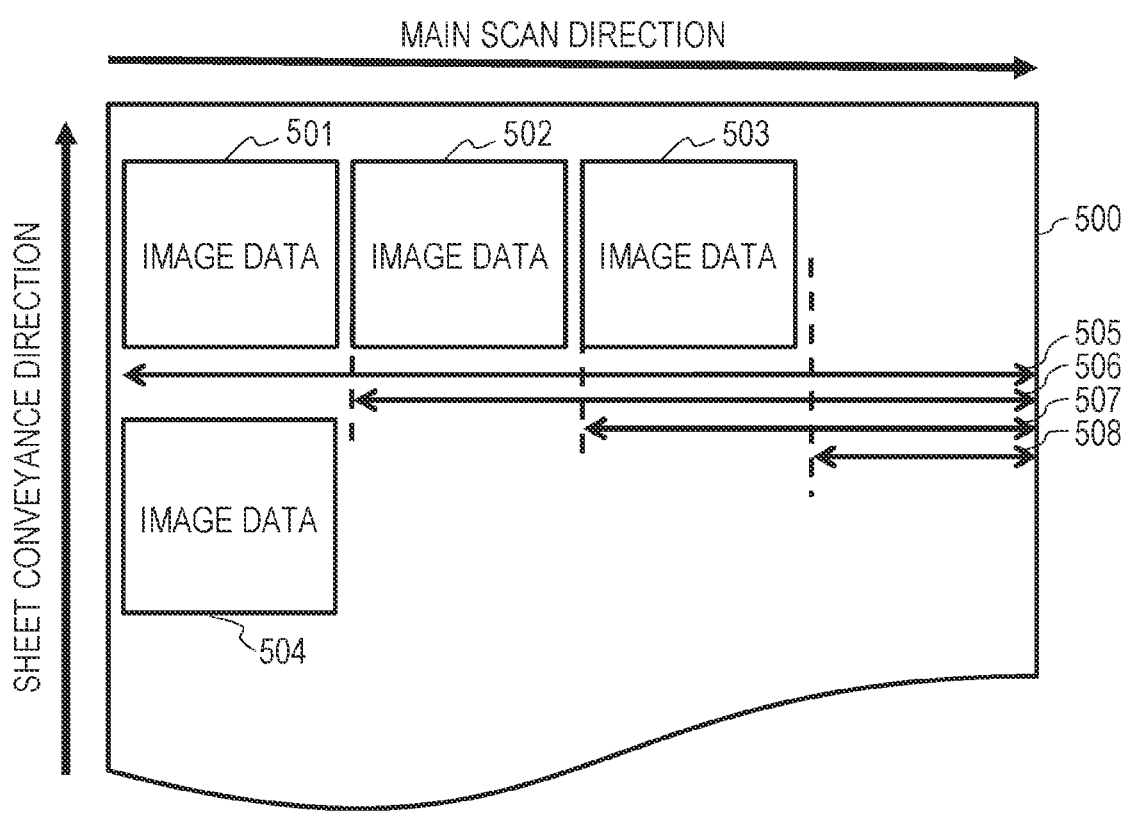
FIG. 5 is a diagram illustrating an example of image data to be subjected to printing in the image forming apparatus.

FIG. 5 is a diagram illustrating an example of positions on a sheet 500 where images represented by image data 501 to 504 are to be printed by the image forming apparatus 100. The image forming apparatus 100 receives the image data 501, the image data 502, the image data 503, and the image data 504 in this order, and prints the images represented by the image data 501 to 504 on the sheet 500. The image data 501, the image data 502, the image data 503, and the image data 504 are image data having the same print setting as each other. As an example of the print setting, all the image data 501 to 504 have a print quality of "Fine". A width 505 is a width across which an image or images represented by image data can be printed in a main scan direction of the sheet 500. A width 506 (hereinafter also referred to as a "margin width 506") is a margin width for a case where the image represented by the image data 501 is printed. A width 507 (hereinafter also referred to as a "margin width 507") is a margin width for a case where the images represented by the image data 501 and 502 are arranged and printed side by side in the main scan direction. A width 508 (hereinafter also referred to as a "margin width 508") is a margin width for a case where the images represented by the image data 501, 502, and 503 are arranged and printed side by side in the main scan direction.

Figure 6:
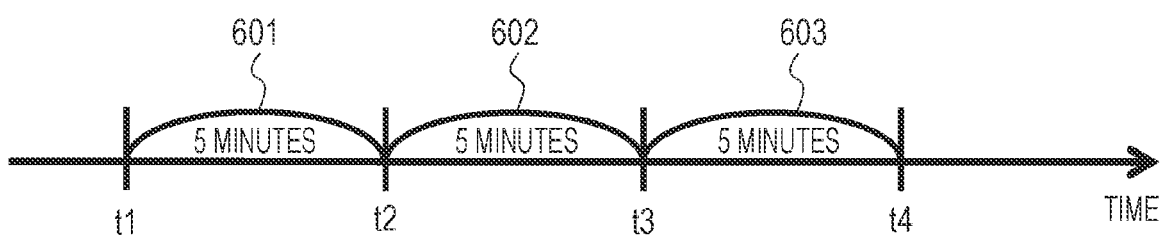
FIG. 6 is a diagram illustrating an example of a lapse of reception time of image data.

FIG. 6 is a diagram illustrating a lapse of time in which the image data 501, the image data 502, the image data 503, and the image data 504 are received. At a time t1, the image forming apparatus 100 starts receiving the image data 501 from the host apparatus 190. At a time t2, the image forming apparatus 100 starts receiving the image data 502 from the host apparatus 190. At a time t3, the image forming apparatus 100 starts receiving the image data 503 from the host apparatus 190. At a time t4, the image forming apparatus 100 starts receiving the image data 504 from the host apparatus 190.

An interval 601 is an interval between the time t1, at which the image data 501 starts to be received, and the time t2, at which the image data 502 starts to be received, and is five minutes. An interval 602 is an interval between the time t2, at which the image data 502 starts to be received, and the time t3, at which the image data 503 starts to be received, and is five minutes. An interval 603 is an interval between the time t3, at which the image data 503 starts to be received, and the time t4, at which the image data 504 starts to be received, and is five minutes.

Figure 7:
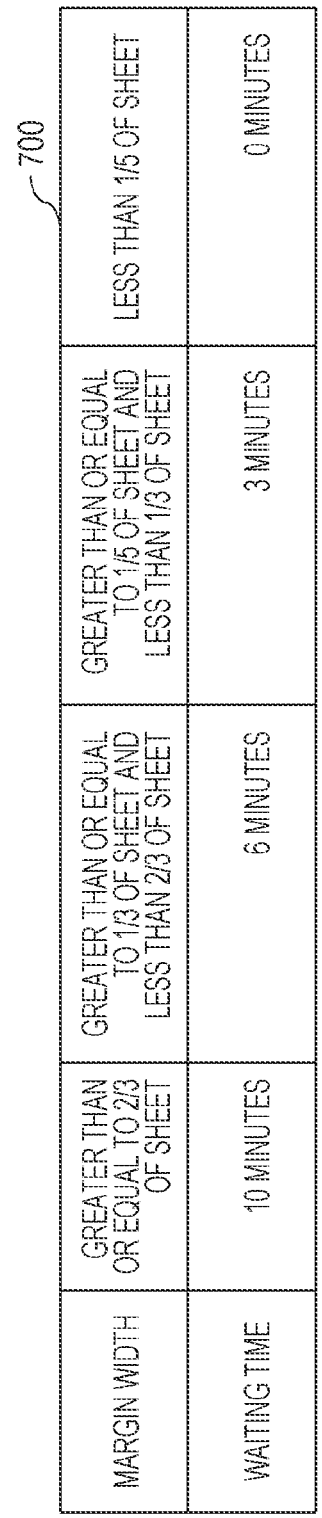
FIG. 7 is a diagram illustrating an example of waiting times until reception of subsequent image data.

FIG. 7 is a diagram illustrating an example of a table 700 illustrating waiting times until subsequent image data corresponding to margin widths in the main scan direction of the sheet 500 are received. The table 700 stores waiting times until subsequent image data corresponding to margin widths in the main scan direction of the sheet 500 are received. In a case where a margin width of the sheet 500 in the main scan direction is greater than or equal to ⅔ of the entire width of the sheet 500 in the main scan direction, the waiting time is ten minutes. In a case where the margin width of the sheet 500 in the main scan direction is greater than or equal to ⅓ of and less than ⅔ of the entire width of the sheet 500 in the main scan direction, the waiting time is six minutes. In a case where the margin width of the sheet 500 in the main scan direction is greater than or equal to ⅕ of and less than ⅓ of the entire width of the sheet 500 in the main scan direction, the waiting time is three minutes. In a case where the margin width of the sheet 500 in the main scan direction is less than ⅕ of the entire width of the sheet 500 in the main scan direction, the waiting time is zero minutes. In the following, the present embodiment will be described with reference to FIGS. 1, 4, 5, 6, and 7.

In Step S401, the host IF 112 receives the image data 501 from the host apparatus 190, stores the received image data 501 in the RAM 114, and sends a notification to the main controller 111.

In Step S402, the main controller 111 determines whether the image represented by the image data 501 stored in the RAM 114 can be printed in the main scan direction of the sheet 500. In a case where the image represented by the image data 501 stored in the RAM 114 can be printed in the main scan direction of the sheet 300, the process proceeds to Step S403. Otherwise, the process proceeds to Step S407. In this case, the width 505, across which printing can be performed on the sheet 500, is greater than or equal to a width necessary for printing the image represented by the image data 501. Thus, the main controller 111 determines that the image represented by the image data 501 can be printed in the main scan direction of the sheet 500, and the process proceeds to Step S403.

In Step S403, the main controller 111 retains, in the RAM 114, the image data 501 as image data representing an image to be printed in the main scan direction of the sheet 500.

In Step S404, the main controller 111 calculates the margin width 506 of the sheet 500 for a case where the image represented by the image data 501 is printed. The main controller 111 stores the margin width 506 in the RAM 114, the margin width 506 being obtained by subtracting the width necessary for printing the image represented by the image data 501 from the width 505, across which an image or images represented by image data can be printed in the main scan direction of the sheet 500. The margin width 506 is, for example, ¾ of the entire width of the sheet 500 in the main scan direction.

In Step S405, the main controller 111 refers to the table 700 to acquire a waiting time corresponding to the margin width 506 of the sheet 500 in the main scan direction. The margin width 506 is ¾ of the entire width of the sheet 500 in the main scan direction and is greater than or equal to ⅔ of the entire width of the sheet 500 in the main scan direction, and thus the waiting time is ten minutes.

In Step S406, the main controller 111 determines whether reception of the next image data is detected within the waiting time (ten minutes) acquired in Step S405 and starting from the reception time of the image data 501 in Step S401. In a case where reception of the next image data is detected within the waiting time, the process proceeds to Step S401. In a case where reception of the next image data is not detected within the waiting time, the process proceeds to Step S407. In this case, the interval 601 is five minutes. Thus, the main controller 111 determines that reception of the next image data, which is the image data 502, is detected within the waiting time (ten minutes), and the process proceeds to Step S401.

In Step S401, the host IF 112 receives the image data 502 from the host apparatus 190, stores the received image data 502 in the RAM 114, and sends a notification to the main controller 111.

In Step S402, the main controller 111 determines whether the images represented by the image data 501 and 502 stored in the RAM 114 can be arranged and printed side by side in the main scan direction of the sheet 500. In a case where the images represented by the image data 501 and 502 stored in the RAM 114 can be printed side by side in the main scan direction of the sheet 500, the process proceeds to Step S403. Otherwise, the process proceeds to Step S407. The width 505, across which printing can be performed on the sheet 500, is greater than or equal to a width necessary for arranging and printing the images represented by the image data 501 and 502 side by side in the main scan direction of the sheet 500. That is, the margin width 506 is greater than or equal to a width necessary for arranging and printing the image represented by the image data 502 in the main scan direction of the sheet 500. The image data 501 and 502 have the same print setting as each other (a print quality of "Fine"). Thus, the main controller 111 determines that the images represented by the image data 501 and 502 can be arranged and printed side by side in the main scan direction of the sheet 500, and the process proceeds to Step S403.

In Step S403, the main controller 111 stores, in the RAM 114, the image data 501 and 502 as image data representing images to be arranged and printed side by side in the main scan direction.

In Step S404, the main controller 111 calculates the margin width 507 of the sheet 500 for a case where the images represented by the image data 501 and 502 are printed. The main controller 111 stores the margin width 507 in the RAM 114, the margin width 507 being obtained by subtracting the width necessary for printing the images represented by the image data 501 and 502 from the width 505, across which an image or images can be printed in the main scan direction of the sheet 500. Note that the margin width 507 may also be calculated as a width obtained by subtracting a width necessary for printing the image represented by the image data 502 from the margin width 506. The margin width 507 is, for example, ½ of the entire width of the sheet 500 in the main scan direction.

In Step S405, the main controller 111 refers to the table 700 to acquire a waiting time corresponding to the margin width 507 of the sheet 500 in the main scan direction. The margin width 507 is ½ of the entire width of the sheet 500 in the main scan direction and is greater than or equal to ⅓ of and less than ⅔ of the entire width of the sheet 500 in the main scan direction, and thus the waiting time is six minutes.

In Step S406, the main controller 111 determines whether reception of the next image data is detected within the waiting time (six minutes) acquired in Step S405 and starting from the reception time of the image data 502 in Step S401. In a case where reception of the next image data is detected within the waiting time, the process proceeds to Step S401. In a case where reception of the next image data is not detected within the waiting time, the process proceeds to Step S407. In this case, the interval 602 is five minutes. Thus, the main controller 111 determines that reception of the image data 503, which is the next image data, is detected within the waiting time (six minutes), and the process proceeds to Step S401.

In Step S401, the host IF 112 receives the image data 503 from the host apparatus 190, stores the received image data 503 in the RAM 114, and sends a notification to the main controller 111.

In Step S402, the main controller 111 determines whether the images represented by the image data 501, 502, and 503 stored in the RAM 114 can be arranged and printed side by side in the main scan direction of the sheet 500. In a case where the images represented by the image data 501, 502, and 503 stored in the RAM 114 can be printed side by side in the main scan direction of the sheet 500, the process proceeds to Step S403. Otherwise, the process proceeds to Step S407. The width 505, across which printing can be performed on the sheet 500, is greater than or equal to a width necessary for arranging and printing the images represented by the image data 501, 502, and 503 side by side in the main scan direction of the sheet 500. That is, the margin width 507 is greater than or equal to a width necessary for arranging and printing the image represented by the image data 503 in the main scan direction of the sheet 500. The image data 503 has the same print setting (a print quality of "Fine") as the image data 501 and 502. Thus, the main controller 111 determines that the images represented by the image data 501, 502, and 503 can be arranged and printed side by side in the main scan direction of the sheet 500, and the process proceeds to Step S403.

In Step S403, the main controller 111 stores, in the RAM 114, the image data 501, 502, and 503 as image data representing images to be arranged and printed side by side in the main scan direction.

In Step S404, the main controller 111 calculates the margin width 508 of the sheet 500 for a case where the images represented by the image data 501, 502, and 503 are printed. The main controller 111 stores the margin width 508 in the RAM 114, the margin width 508 being obtained by subtracting the width necessary for printing the images represented by the image data 501, 502, and 503 from the width 505, across which an image or images can be printed in the main scan direction of the sheet 500. Note that the margin width 508 may also be calculated as a width obtained by subtracting a width necessary for printing the image represented by the image data 503 from the margin width 507. The margin width 508 is, for example, ¼ of the entire width of the sheet 500 in the main scan direction.

In Step S405, the main controller 111 refers to the table 700 to acquire a waiting time corresponding to the margin width 508 of the sheet 500 in the main scan direction. The margin width 508 is ¼ of the entire width of the sheet 500 in the main scan direction and is greater than or equal to ⅕ of and less than ⅓ of the entire width of the sheet 500 in the main scan direction, and thus the waiting time is three minutes.

In Step S406, the main controller 111 determines whether reception of the next image data is detected within the waiting time (three minutes) acquired in Step S405 and starting from the reception time of the image data 503 in Step S401. In a case where reception of the next image data is detected within the waiting time, the process proceeds to Step S401. In a case where reception of the next image data is not detected within the waiting time, the process proceeds to Step S407. In this case, the interval 603 is five minutes. Thus, the main controller 111 determines that reception of the next image data is not detected within the waiting time (three minutes), and the process proceeds to Step S407.

In Step S407, the main controller 111 performs control so as to arrange, in the main scan direction of the sheet 500, the image data 501, 502, and 503 to start printing. The image processing unit 116 performs image processing on the image data 501, 502, and 503 in accordance with a command from the main controller 111, and stores, in the RAM 114, the image data 501, 502, and 503 after being subjected to image processing. The main controller 111 requests, through the print engine IF 113 and the controller IF 121, the print controller 122 to print images represented by the image data 501, 502, and 503 after being subjected to image processing. The print controller 122 stores, in the RAM 124, the image data 501, 502, and 503 after being subjected to image processing. The image processing controller 125 converts, in accordance with a command from the print controller 122, the image data 501, 502, and 503 after being subjected to image processing into recording data such that the recording data can be used in a recording operation performed by the recording head 130. Thereafter, the conveyance controller 129 conveys the sheet 500 in the sheet conveyance direction in accordance with a command from the print controller 122. In accordance with a command from the print controller 122, the recording head 130 prints, on the sheet 500, images represented by the recording data based on the image data 501, 502, and 503 after being subjected to image processing, in conjunction with the sheet 500 being conveyed.

The images represented by the image data 501, 502, and 503 are arranged and printed side by side in the main scan direction of the sheet 500.

Note that in a case where the main controller 111 determines in Step S402 that the images represented by the image data cannot be printed in the main scan direction of the sheet 500, the process proceeds to Step S407. In that case, in Step S407, the main controller 111 performs control so as to arrange, in the main scan direction of the sheet 500, a plurality of image data that include not the currently received image data but the previously received image data and the image data received before the previously received image data to start printing.

Thereafter, the image forming apparatus 100 prints an image represented by recording data based on the image data 504 through substantially the same processing as described above. The image represented by the image data 504 is printed at a different position from the images represented by the image data 501, 502, and 503 in the sheet conveyance direction.

As described above, in Step S401, the host IF 112 serves as a reception unit, and receives the image data 501 to 504, which are a plurality of image data, in this order. In Step S404, the main controller 111 calculates the width of a margin of the sheet 500 in the main scan direction for a case where images represented by a plurality of image data received by the host IF 112 are arranged and printed side by side in the main scan direction of the sheet 500. In Step S405, the main controller 111 serves as a determination unit and determines a waiting time in accordance with the margin width calculated in Step S404.

In Step S406, in a case where reception of the next image data is detected within the waiting time from a reception time of the previously received image data, the main controller 111 does not start printing, and the process proceeds to Step S401. In a case where reception of the next image data is not detected within the waiting time from the reception time of the previously received image data, the process proceeds to Step S407. In Step S407, the main controller 111 serves as a controller, and performs control so as to arrange, in the main scan direction of the sheet 500, the plurality of image data received by the host IF 112 to start printing.

As in FIG. 7, the narrower the margin width of the sheet 500 in the main scan direction for a case where images represented by a plurality of image data received by the host IF 112 are arranged and printed side by side in the main scan direction of the sheet 500, the shorter the above-described waiting time.

In Step S402, in a case where the width of a print region for a case where images represented by a plurality of image data received by the host IF 112 are arranged and printed side by side in the main scan direction of the sheet 500 exceeds the width 505, which is a printable width of the sheet 500, the process proceeds to Step S407.

In that case, in Step S407, the main controller 111 performs control so as to arrange, in the main scan direction of the sheet 500, image data obtained by excluding last received image data from the plurality of image data received by the host IF 112 to start printing.

As described above, the main controller 111 refers to the table 700 to determine a waiting time in accordance with the width of a margin of the sheet 500 in the main scan direction. The image forming apparatus 100 arranges image data received within the waiting time in the main scan direction of the sheet 500. In a case where reception of the next image data is not detected within the waiting time, the image forming apparatus 100 performs control so as to start printing images of the image data arranged in the main scan direction of the sheet 500. As a result, wastage of the sheet 500 can be reduced.

The image forming apparatus 100 changes, in accordance with the width of a margin of the sheet 500 in the main scan direction, a waiting time for receiving the next image data such that the larger the margin width is, the later the start timing of printing. As a result, wastage of the sheet 500 can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-092226, filed Jun. 7, 2022, which is hereby incorporated by reference herein in its entirety.

What is claimed is:

1. An image forming apparatus comprising:
   a communication interface configured to receive a plurality of image data in a sequential manner; and
   a controller configured to perform control, in a case where first image data among the plurality of image data is received, so as not to start printing upon reception of the first image data in a case where the first image data has a different print setting from second image data received before the first image data, and perform control, in a case where third image data received after the first image data has a same print setting as the second image data, so as to arrange, in a main scan direction of a sheet, image data having the same print setting and including not the first image data but the second image data and the third image data to start printing,
   wherein the controller
   causes, in a case where currently received image data has a same print setting as first received image data and where the sheet has a margin that allows images represented by the currently received image data and image data having the same print setting and including the first received image data to be arranged and printed side by side in the main scan direction of the sheet, the currently received image data to be included in the image data arranged in the main scan direction of the sheet to start printing, and
   does not cause, in a case where the currently received image data has a same print setting as the first received image data and where the sheet does not have a margin that allows images represented by the currently received image data and the image data having the same print setting and including the first received image data to be arranged and printed side by side in the main scan direction of the sheet, the currently received image data to be included in the image data arranged in the main scan direction of the sheet to start printing.

2. The image forming apparatus according to claim 1, wherein
   the controller
   causes, in a case where currently received image data has a same print setting as first received image data, the currently received image data to be included in image data arranged in the main scan direction of the sheet to start printing, and
   does not cause, in a case where the currently received image data has a different print setting from the first received image data, the currently received image data to be included in image data that represent images to be arranged and printed side by side in the main scan direction of the sheet.

3. The image forming apparatus according to claim 2, wherein in a case where the currently received image data after receiving the third image data has a different print setting from the first received image data and where a margin width of the sheet in the main scan direction for a case where images represented by image data having the same print setting and including the second image data and the third image data are arranged and printed side by side in the main scan direction of the sheet is less than a first threshold, the controller performs control so as arrange, in the main scan direction of the sheet, the image data having the same print setting and including the second image data and the third image data to start printing.

4. The image forming apparatus according to claim 1, wherein
   in a case where the currently received image data after receiving the third image data has a different print setting from the first received image data and where a margin width of a sheet in the main scan direction for a case where images represented by image data having the same print setting and including the second image data and the third image data are arranged and printed side by side in the main scan direction of the sheet is less than a first threshold, the controller performs control so as to arrange, in the main scan direction of the sheet, the image data having the same print setting and including the second image data and the third image data to start printing, and
   in a case where the currently received image data after receiving the third image data has the same print setting as the first received image data, where the sheet does not have a margin that allows the images represented by the currently received image data and image data having the same print setting and including the first received image data to be arranged and printed side by side in the main scan direction of the sheet, and where a margin width of the sheet in the main scan direction for a case where the images represented by the image data having the same print setting and including the second image data and the third image data are arranged and printed side by side in the main scan direction of the sheet is less than the first threshold, the controller performs control so as to arrange, in the main scan direction of the sheet, the image data having the same print setting and including the second image data and the third image data to start printing.

5. The image forming apparatus according to claim 1, wherein in a case where the currently received image data after receiving the third image data has the same print setting as the first received image data, where the sheet has a margin that allows the images represented by the currently received image data and image data having the same print setting and including the first received image data to be arranged and printed side by side in the main scan direction of the sheet, and where a margin width of the sheet in the main scan direction for a case where images represented by image data having the same print setting and including the second image data and the third image data are arranged and printed side by side in the main scan direction of the sheet is less than a second threshold, the controller performs control so as to arrange, in the main scan direction of the sheet, the image data having the same print setting and including the second image data and the third image data to start printing.

6. The image forming apparatus according to claim 1, wherein
the controller
does not start printing in a case where reception of next image data is detected within a predetermined time from a reception time of previously received image data, and
in a case where reception of the next image data is not detected within the predetermined time from the reception time of the previously received image data, performs control so as to arrange, in the main scan direction of the sheet, the image data having the same print setting to start printing.

7. The image forming apparatus according to claim 1, wherein
a print position of the second image data in a sheet conveyance direction and a print position of the third image data in the sheet conveyance direction are same as each other, and
a print position of the first image data in the sheet conveyance direction is different from the print positions of the second image data and the third image data in the sheet conveyance direction.

8. The image forming apparatus according to claim 1, wherein the print setting is print quality.

9. A method for controlling an image forming apparatus comprising:
receiving a plurality of image data in a sequential manner;
performing control, in a case where first image data among the plurality of image data is received, so as not to start printing upon reception of the first image data in a case where the first image data has a different print setting from second image data received before the first image data, and performing control, in a case where third image data received after the first image data has a same print setting as the second image data, so as to arrange, in a main scan direction of a sheet, image data having the same print setting and including not the first image data but the second image data and the third image data to start printing; and
performing control
to cause, in a case where currently received image data has a same print setting as first received image data and where the sheet has a margin that allows images represented by the currently received image data and image data having the same print setting and including the first received image data to be arranged and printed side by side in the main scan direction of the sheet, the currently received image data to be included in the image data arranged in the main scan direction of the sheet to start printing, and
to not cause, in a case where the currently received image data has a same print setting as the first received image data and where the sheet does not have a margin that allows images represented by the currently received image data and the image data having the same print setting and including the first received image data to be arranged and printed side by side in the main scan direction of the sheet, the currently received image data to be included in the image data arranged in the main scan direction of the sheet to start printing.

* * * * *